United States Patent [19]
Phillips

[11] Patent Number: 5,217,202
[45] Date of Patent: Jun. 8, 1993

[54] COMPRESSOR AIR TANK PLUG
[75] Inventor: Alan G. Phillips, Jackson, Tenn.
[73] Assignee: DeVilbiss Air Power Company, Jackson, Tenn.
[21] Appl. No.: 902,680
[22] Filed: Jun. 22, 1992
[51] Int. Cl.⁵ .................... F16K 51/00; C23F 13/00
[52] U.S. Cl. .................... 251/144; 411/14; 411/900; 204/197
[58] Field of Search .............. 251/144; 411/14, 900, 411/383; 204/196, 197

[56] References Cited

U.S. PATENT DOCUMENTS

| | | | |
|---|---|---|---|
| 629,092 | 7/1899 | Ross | 204/197 |
| 2,343,440 | 3/1944 | Andrus | 204/197 |
| 2,786,643 | 3/1957 | Carlstedt | 251/144 |
| 3,367,623 | 2/1968 | Piel | 251/144 |
| 3,867,274 | 2/1975 | Herman | 204/197 |
| 4,146,448 | 3/1979 | Nakano et al. | 204/197 X |

Primary Examiner—Martin P. Schwadron
Assistant Examiner—Kevin L. Lee
Attorney, Agent, or Firm—MacMillan, Sobanski & Todd

[57] ABSTRACT

An anti-corrosion plug for closing a threaded condensate drain opening in a compressor air tank. The plug is formed from a material having a lower potential in the electrochemical series than said air tank to prevent electrolytic corrosion of the tank. The plug has a central cavity open to receive any condensate in the tank. An acid neutralizing insert, for example, of limestone, is located in the cavity to neutralize any acidity in the tank condensate.

5 Claims, 1 Drawing Sheet

COMPRESSOR AIR TANK PLUG

TECHNICAL FIELD

The invention relates to compressed air tanks and more particularly to an improved anti-corrosion plug for a drain opening in an air compressor tank.

BACKGROUND ART

Air compressors commonly have difficulty in producing adequate air flow under peak demands and also may have a pulsating air output. For example, a typical air compressor design has a piston which reciprocates in a cylinder alternately between an intake stroke and a compression stroke. Compressed air is available from the compressor only during the compression stroke. In order to smooth out the air flow, to provide an air reserve during peak demand periods and to allow the compressor motor to be idled down or stopped when there is either a low demand or no demand for compressed air, the compressor is commonly connected to a reservoir tank. The tank will have a volume equal to the compressor output over a period of time. A switch turns the compressor motor on when the tank pressure drops to a preset low level and off when the tank pressure reaches a preset high level. The air pressure in the tank dampens pulsations from the compressor. A tool or other air consumer draws compressed air from the tank. During use of a compressed air tank, it is common for water or other liquids to condense from the air in the tank as a consequence of the pressures and temperatures. These liquids may contain acid or other corrosive substances. The source of the acid or corrosive substance may include, but is not limited to, atmospheric gases or contaminants, lubricating oil or its by-products, or other compressor materials released into the air receiver as a result of wear. Typically, a drain plug or drain valve is installed at a low point in the bottom of the air tank. Periodically, the plug is removed or the drain valve is opened to allow any accumulated condensate to drain from the tank.

When condensate is allowed to remain in an air tank, the tank can corrode and eventually fail. Tank corrosion may be increased by a low Ph in the accumulated condensate, i.e., acidic water, or by electrolysis if different metals are present in the tank, such as at a weld.

DISCLOSURE OF INVENTION

According to the invention, an improved tank plug is provided for a drain opening in a compressed air tank. The drain opening is threaded to receive a removable plug or a drain valve. The tank plug is threaded to engage the opening. The tank plug is formed from a metal which has a lower potential in the electrochemical series than the material of which the tank is constructed. For example, if the air tank is of steel, the tank plug may be of zinc or magnesium. Thus, the plug forms a sacrificial anode in that it is subject to electrolytic corrosion before the tank. In order to further reduce corrosion, the plug is generally cup shaped, having a central opening which opens into the tank. The plug is filled with an alkalinity material, such as limestone, which will neutralize any acidic condensate created by compression of gases under high pressure and temperatures. Optionally, the plug may be provided with a threaded central opening which either receives a smaller plug which is removed for draining tank condensate or receives a drain valve which is opened to drain tank condensate.

Accordingly, it is an object of the invention to provide an improved plug for a drain opening in a compressed air tank.

Other objects and advantages of the invention will become apparent from the following detailed description of the invention and the accompanying drawings.

BEST MODE FOR CARRYING OUT THE INVENTION

Figure 1:
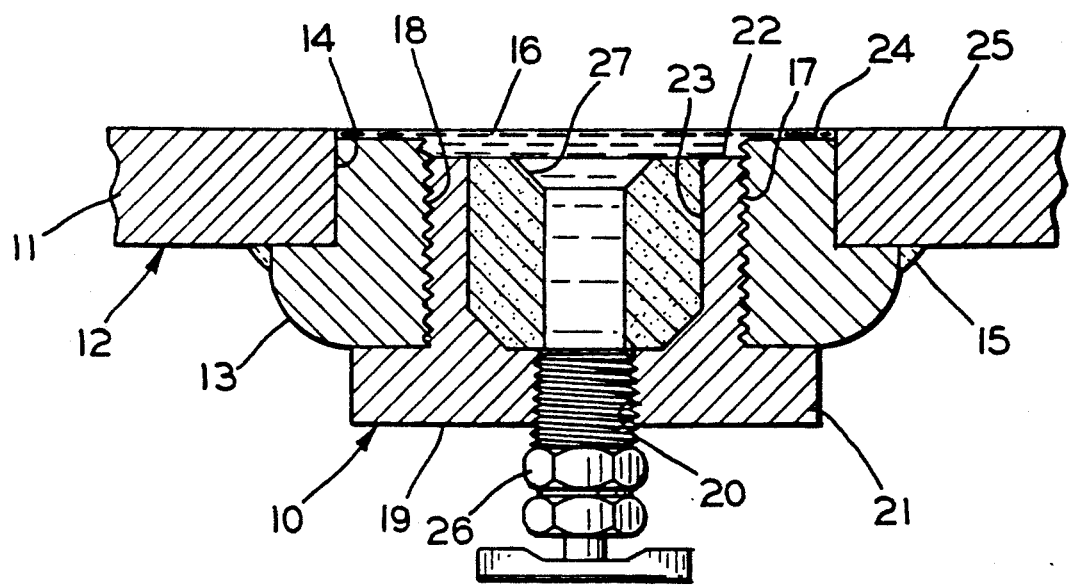
FIG. 1 is a fragmentary cross sectional view through a portion of a compressor air tank wall showing details of a tank plug according to the invention installed in the tank.
Figure 2:
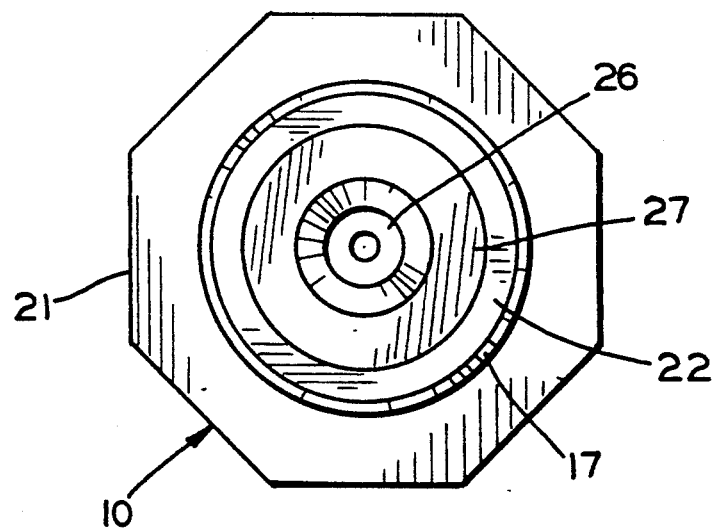
FIG. 2 is top plan view of the tank plug of the invention.

Turning to FIGS. 1 and 2 of the drawings, an air tank plug 10 according to the invention is shown installed in a wall 11 of a compressor air tank 12. A conventional threaded fitting 13 is secured to an opening 14 in the tank wall 11 by a weldment 15. The opening 14 is located at the gravitational bottom of the tank 12 when the tank 12 is in a normal operating position so that any condensate 16 in the tank 12 will accumulate at the opening 14.

The air tank plug 10 is hollow or generally cup shaped and has a threaded exterior 17 sized to engage a threaded opening 18 in the fitting 13. An end 19 of the plug 10 has a threaded central opening 20 and has a hexagonal perimeter 21 for receiving a tool such as a wrench (not shown) when securing the plug 10 to or removing the plug 10 from the fitting 13. The plug 10 also has an end 22 located within the air tank and a central cavity 23 which is open at the plug end 22. The central opening 20 connects to the cavity 23. Preferably, the tank fitting 13 has an inner end 24 which is spaced slightly below an inner surface 25 of the tank wall 11 and the plug end 22 is spaced slightly below the fitting end 24 so that any condensate 16 will naturally flow to the cavity 23.

The tank plug opening 20 is normally closed by a plug 26 which may be either solid or may consist of a small drain valve, as shown. The condensate 16 is periodically drained from the air tank 12 either by removing the plug 26 or, if the plug 26 has a valve, by opening the valve.

According to the invention, the risk of corrosion of the air tank 12 is significantly reduced or eliminated both by neutralizing any acid in the tank condensate 16 and by forming the plug 10 as a sacrificial anode. An annular insert 27 is mounted in the cavity 23 of the tank plug 10. The insert 27 is formed from a basic material, i.e., above 7 on the Ph scale, such as limestone. The material of the insert 27 is selected to neutralize any acidity of the condensate 16. The acid neutralization is enhanced by having the insert 27 located at a gravitational low point so that it will come into contact with any condensate 16 and also by agitation caused by operation of an air compressor (not shown) which is typically mounted on top of the air tank.

Typically, the air tank 12 and the fitting 13 are made of steel. In order to prevent electrolytic corrosion of the tank 12, the tank plug 10 is formed as a sacrificial anode. This is accomplished by forming the tank plug 10 from a metal having a more negative potential in the electrochemical series than the other materials in the tank 12. Steel, may have a potential on the order of $-0.409$ volts. By forming the plug from, for example, zinc which has a potential of $-0.7628$ or magnesium which has a potential of $-2.375$, the drain plug 10 will be subject to electrolytic corrosion before the steel tank. For the tank plug 10 to be an effective sacrificial anode, it must be in electrical contact with the air tank 12. Accordingly, if any thread sealant is used on the tank plug 10, it should be an electrically conductive sealant.

The tank plug 10 is easily removed and inspected for corrosion and if it does corrode, it is easily replaced. On the other hand, if the air tank 12 corrodes, the tank 12 may eventually fail. The tank 12 is not as easily or cheaply replaced as the tank plug 10. Further, since the tank plug 10 is located at the gravitational bottom of the tank 12, a failed plug 10 will rupture in a safe downward direction, minimizing the risk of injury to anyone in the vicinity of the tank 12.

The tank plug 10 is shown having a central opening 20 for receiving the drain plug 26. However, it will be appreciated that the opening 20 may be eliminated and that the tank plug 10 may be removed for draining condensate 16 from the tank 12. Various other modifications and changes may be made to the tank plug 10 without departing from the spirit and the scope of the following claims.

I claim:

1. A plug for engaging a threaded opening in a compressed air tank comprising a metal body having a portion threaded to engage said threaded tank opening, said body being of a material having a lower potential in the electrochemical series than said air tank, said body defining a cavity opening into an interior of said tank, and an insert located in said cavity formed of an acid neutralizing material.

2. A plug for an air tank opening, as set forth in claim 1, wherein said insert is of limestone.

3. A plug for an air tank opening, as set forth in claim 2, wherein said insert is annular having a central opening, and wherein said plug includes a threaded opening aligned with said central insert opening, and a removable drain plug threadably engaging said threaded plug opening.

4. A plug for an air tank opening, as set forth in claim 3, wherein said removable drain plug includes valve means which can be opened to drain condensate from said air tank.

5. A plug for an air tank opening, as set forth in claim 1, wherein said plug body is formed from a metal selected from the group of zinc and magnesium.

* * * * *